(12) United States Patent
Kessinger

(10) Patent No.: US 12,711,437 B1
(45) Date of Patent: Aug. 18, 2026

(54) SKILLS-BASED AND COMMUNITY-DRIVEN PHILANTHROPY SYSTEM AND METHOD FOR FACILITATING SEVA

(71) Applicant: Roger A. Kessinger, Whitefish, MT (US)

(72) Inventor: Roger A. Kessinger, Whitefish, MT (US)

( * ) Notice: Subject to any disclaimer, the term of this patent is extended or adjusted under 35 U.S.C. 154(b) by 0 days.

(21) Appl. No.: 19/251,632

(22) Filed: Jun. 26, 2025

(51) Int. Cl.
*G06Q 10/0631* (2023.01)
*G06Q 30/0279* (2023.01)

(52) U.S. Cl.
CPC . *G06Q 10/063112* (2013.01); *G06Q 30/0279* (2013.01)

(58) Field of Classification Search
None
See application file for complete search history.

(56) References Cited

U.S. PATENT DOCUMENTS

2009/0327122 A1* 12/2009 Isac ........................ G06Q 40/00 463/25
2011/0137730 A1* 6/2011 McCarney ........ H04M 3/42289 705/14.58
2016/0092942 A1* 3/2016 Michaels ........... G06Q 30/0279 705/329
2016/0132942 A1* 5/2016 DeBiase ............ G06Q 30/0279 705/329
2020/0142931 A1* 5/2020 Acheatel ................ G06Q 50/22

FOREIGN PATENT DOCUMENTS

CA 2998274 A1 * 9/2018 .............. G06N 3/09

OTHER PUBLICATIONS

Kiera Dempsey-Brench et.al., "Skills-based volunteering: A systematic literature review of the intersection of skills and employee volunteering," Human Resource Management Review, vol. 32, Issue 4, 2022, pp. 1-20 (Year: 2022).*

* cited by examiner

*Primary Examiner* — Amanda Gurski
(74) *Attorney, Agent, or Firm* — Hanrahan Law Firm, P.A.; Benjamin M. Hanrahan

(57) ABSTRACT

A skills-based and community-driven philanthropy platform, system and method is provided herein. The platform, system and method establish a comprehensive ecosystem for charitable giving, volunteerism and collaboration by integrating live and recorded streaming, skill-matching algorithms, and community engagement tools. In particular, a plurality of philanthropic opportunity records are created, each of which include at least one identified skill and location. The records are then stored at a remote-based management system, accessible by a plurality of user devices. User inputs are then received to define user profile records, that include at least one user skill preference, among other entries. Using a skill-matching module executed by a processor, the skills of the user profile records are matched with one or more of the available philanthropic opportunity records based on the at least one skill associated therewith. Community-driven interactive tools are also provided, including live streaming with integrate donation and chat modules.

13 Claims, 13 Drawing Sheets

| Organization Or Charity | Opportunity | Skill(s) Required | Dates | Location |
|---|---|---|---|---|
| Org. A | Volunteer | Food Server | 7/1/25-7/15/25 | Soup Kitchen A |
| Org. A | Volunteer | Food Preparation | 7/1/25-7/15/25 | Soup Kitchen A |
| Org. B | Volunteer | Construction | 8/5/25 | House B Address |

SKILLS-BASED AND COMMUNITY-DRIVEN PHILANTHROPY SYSTEM AND METHOD FOR FACILITATING SEVA

FIELD OF THE INVENTION

The present invention generally relates to a digital platform, system and method for facilitating Seva and philanthropy, and more specifically, to a platform, system and method that provides a comprehensive ecosystem for charitable giving, volunteerism and collaboration, and which includes an advanced and intelligent skill-based matching module, live streaming and other community-driven modules.

BACKGROUND OF THE INVENTION

Seva is a Sanskrit word that means "selfless service" or "serving others without expectation of reward." It is a key concept in Hinduism, as well as in other Indian religions like Sikhism and Jainism. Seva is considered a spiritual practice and a way to express devotion, compassion, and humility. In Hinduism, seva is often directed toward serving the divine, humanity, or all living beings. It can take many forms, such as volunteering, helping those in need, or contributing to the community. Seva is rooted in the idea of karma yoga (the path of selfless action), where actions are performed as an offering to God or for the welfare of others, without attachment to the results.

Seva is also deeply connected to the principle of dharma (duty) and the belief that serving others is a way to purify the mind, cultivate humility, and progress on the spiritual path. It is often practiced in temples, ashrams, and charitable organizations, as well as in everyday life.

There are, however, current challenges in philanthropy and Seva which can include, for example, exclusion of non-monetary contributions (such as volunteering), inefficient resource allocation, lack of transparency, and limited or no community engagement.

Specifically, many individuals lack financial resources but possess valuable skills (e.g., teaching, coding, design) that could benefit charitable causes. Existing platforms fail to leverage the individuals' skills effectively, leaving a significant portion of potential contributors unable to participate meaningfully.

Furthermore, traditional platforms do not effectively match volunteers with opportunities that align with their skills, leading to underutilization of talent and reduced impact. More specifically, while some platforms allow users to volunteer, they lack sophisticated algorithms to match skills with specific needs. For example, a software developer might be matched with a manual labor opportunity, or a graphic designer might be matched with a teaching opportunity, leading to inefficiencies, frustration, and missed opportunities for both the volunteer and the organization.

In addition, donors and volunteers frequently lack visibility into how their contributions are used, which can erode trust and discourage sustained engagement. Without clear evidence of impact, individuals may hesitate to contribute their time, skills, or resources.

Moreover, many platforms fail to foster a sense of community, which is critical for building long-term relationships and encouraging collaboration. Many platforms lack features to foster collaboration and interaction among users, such as forums, event calendars, or mentorship programs. Similarly, most platforms do not offer tools for real-time engagement, such as live streaming, which can enhance transparency and donor participation. A strong sense of community is essential for inspiring collective action and long-term commitment. Real-time interaction allows donors and volunteers to see the immediate impact of their contributions, fostering trust and engagement. Conversely, a lack of interaction and shared purpose can lead to isolated efforts and diminished collective impact.

Additionally, there is often no mechanism to track and verify the impact of skill-based contributions, making it difficult to measure success and demonstrate accountability. Without robust impact tracking, organizations struggle to attract sustained support.

Accordingly, there is a need for a platform, system and method that includes an advanced and intelligent skill-based matching module, live streaming and other community-driven modules to create a comprehensive ecosystem for charitable giving, volunteerism, and collaboration. In some embodiments, the present invention is implemented as a software-based system or method and provides an improvement to the technology surrounding charitable management platforms as well as improvements to the processor, server, mobile devices and other hardware involved in the implementation thereof.

SUMMARY OF THE INVENTION

Accordingly, the present invention is generally directed to a digital platform, system and/or method that facilitates Seva (selfless service) and philanthropy by integrating several features, modules and/or tools, such as, for example, an intelligent skill-matching module that uses artificial intelligence (AI), machine learning, natural language processing (NLP) and other proprietary algorithms to match volunteers' skills with charity needs, ensuring efficient resource allocation.

In at least one embodiment, a remote-based platform or server is communicative with a plurality of user devices, such as mobile phones, tablet computers, desktop computers, laptop computers, etc. in order to provide an improved ecosystem through which donors, volunteers, and other individuals are able to interact, communicate, and integrate with one another to enhance the entire system and process involved in charitable giving and management thereof. As described herein, users can access the system, method or platform via a software-based application installed on or accessible by the user device, or by accessing a web page or web site through a web browser or other like application installed on or accessible by the user device. As will become apparent from the description provided herein, the system, method, and platform improves the functioning of and operation of the user devices, including the software and hardware thereof, as well as the remote-based management system in order to create an enhanced and comprehensive ecosystem whereby users are able to interact with one another, encourage on another, share experiences, and provide donations, whether monetary or non-monetary.

Furthermore, some embodiments of the present invention also include a live and recorded streaming or broadcasting platform or module that allows users to broadcast the progression of or work on a charitable project. In some cases, the broadcasting module may include integrated real-time donation modules and interactive engagement tools, such as live chat, polls or quizzes, augmented reality features, etc.

Additional features of at least one embodiment of the present invention may include one or more community building tools or modules, including, but in no way limited to one or more interactive community forums, event calendars, and gamification elements that foster collaboration and interaction among users, and incentivize user participation and engagement.

Furthermore, an impact Tracking and Verification module may be included to track and verify the impact of skill-based contributions, ensuring transparency and accountability, and a Seva module may be included for promoting selfless service, including non-monetary recognition systems, resource donation tools, and community-driven initiatives.

In some embodiments, a dedicated Seva module may be included for promoting selfless service, including non-monetary recognition systems, resource donation tools, and community-driven initiatives.

In this manner, the platform, system and method of the various embodiments of the present invention create an equitable, transparent and impactful ecosystem or charitable giving, volunteerism and collaboration.

Example: Disaster Relief Efforts

During natural disasters, there is often an urgent need for specific skills, such as medical expertise, construction or logistics. However, it is often difficult to quickly match skilled volunteers with relief organizations, lending to delays and inefficiencies. For instance, after a hurricane, a relief organization might need carpenters to rebuild homes but lack the tools to connect with available volunteers. In this manner, the proposed skills-based philanthropy platform of the present invention with advanced matching algorithms could connect volunteers with opportunities in real-time, ensuring that critical needs are met.

Example: Educational Initiatives

Nonprofits focused on education often require volunteers with specialized skills, such as teaching, curriculum development, or IT support. It can be difficult to match these needs with qualified volunteers, resulting in missed opportunities for impact. For example, a rural school in need of IT infrastructure might struggle to find a volunteer with the necessary expertise. Accordingly, the proposed platform of the present invention that categorizes opportunities by skill type and uses AI-driven matching could significantly improve outcomes by connecting the school with a qualified IT professional.

Example: Transparency in Charitable Projects

Donors often want to see how their contributions are being used; however, traditional platforms provide little or no transparency. For instance, a donor who funds a school construction project may not have access to real-time updates or visual evidence of progress. Accordingly, the proposed platform of the present invention with integrated and immersive live streaming and impact tracking tools could address this by allowing donors to view construction updates and interact with project leaders, fostering trust and engagement.

Example: Community Engagement in Fundraising

Many fundraising campaigns struggle to engage donors beyond the initial contribution. For example, a charity run may raise funds but fail to build a lasting community of supporters. According, the proposed platform of at least one embodiment of the present invention includes community building tools, such as forums, event calendars, and gamification, to foster ongoing engagement and collaboration. By creating a sense of belonging and shared purpose, the platform could transform one-time donors into lifelong advocates.

Example: Seva in Cultural and Religious Contexts

In many cultures and religions, Seva (selfless service) is a deeply rooted practice. For example, during religious festivals, communities often organize food drives, medical camps, or educational workshops. However, coordinating these efforts can be challenging due to a lack of centralized platforms. Accordingly, the proposed digital platform of at least one embodiment of the present invention facilitates Seva by connecting volunteers with opportunities, providing real-time updates, and fostering community engagement, which can significantly enhance the impact of these initiatives.

Example: Corporate Social Responsibility (CSR) Programs

Many companies have CSR programs that encourage employees to volunteer their skills for social causes. However, these programs often face challenges in identifying suitable opportunities and tracking their employee participation. Accordingly, the skill-based philanthropy platform of at least one embodiment of the present invention could streamline this process by matching employees with relevant opportunities, providing real-time impact tracking and generating reports for CSR compliance.

Example: Global Health Initiatives

Global health organizations often require skilled volunteers, such as doctors, nurses and public health experts to address urgent needs in underserved areas. Traditional platforms may not effectively match these needs with qualified volunteers, leading to delays in critical healthcare delivery. Accordingly, the platform of at least one embodiment of the present invention with advanced skill-matching algorithms and real-time communication tools could ensure that skilled volunteers are deployed quickly and efficiently, saving lives and improving health outcomes.

Example: Environmental Conservation Projects

Environmental organizations often rely on volunteers for activities such as tree planting, wildlife monitoring, and clean-up campaigns. However, coordinating these efforts can be challenging due to a lack of centralized platforms. Accordingly, the proposed digital platform of at least one embodiment of the present invention that connects volunteers with environmental projects, provides real-time updates and fosters community engagement could significantly enhance the impact of conservation efforts.

BRIEF DESCRIPTION OF DRAWINGS

FIG. 5 is an exemplary chart illustrating philanthropic opportunity records as disclosed in accordance with at least one embodiment of the present invention.

Like reference numerals refer to like parts throughout the several views of the drawings provided herein.

DETAILED DESCRIPTION OF THE INVENTION

Figure 1:
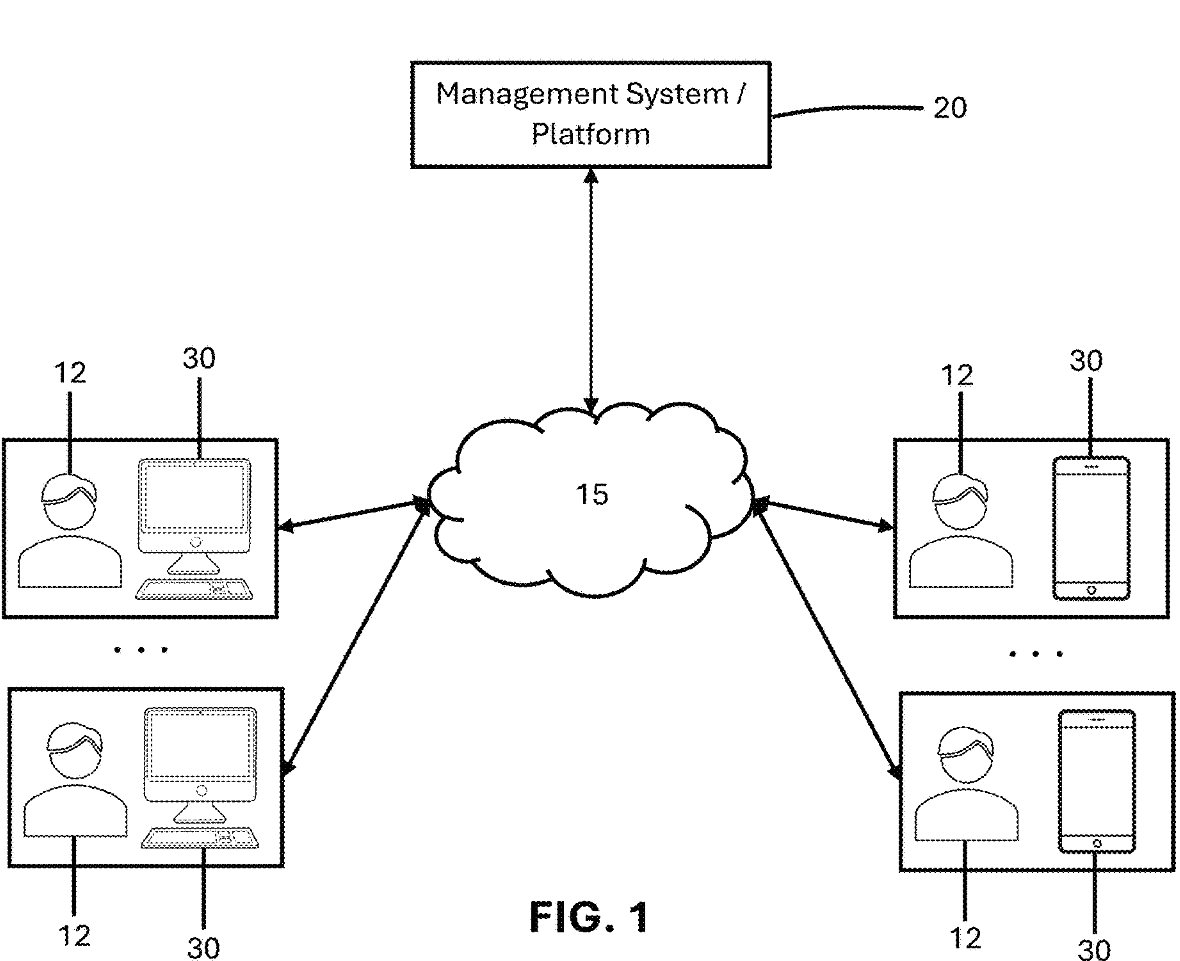
FIG. 1 is a block diagram of the skills-based and community-driven philanthropy system as disclosed in accordance with at least one embodiment of the present invention.
Figure 3:
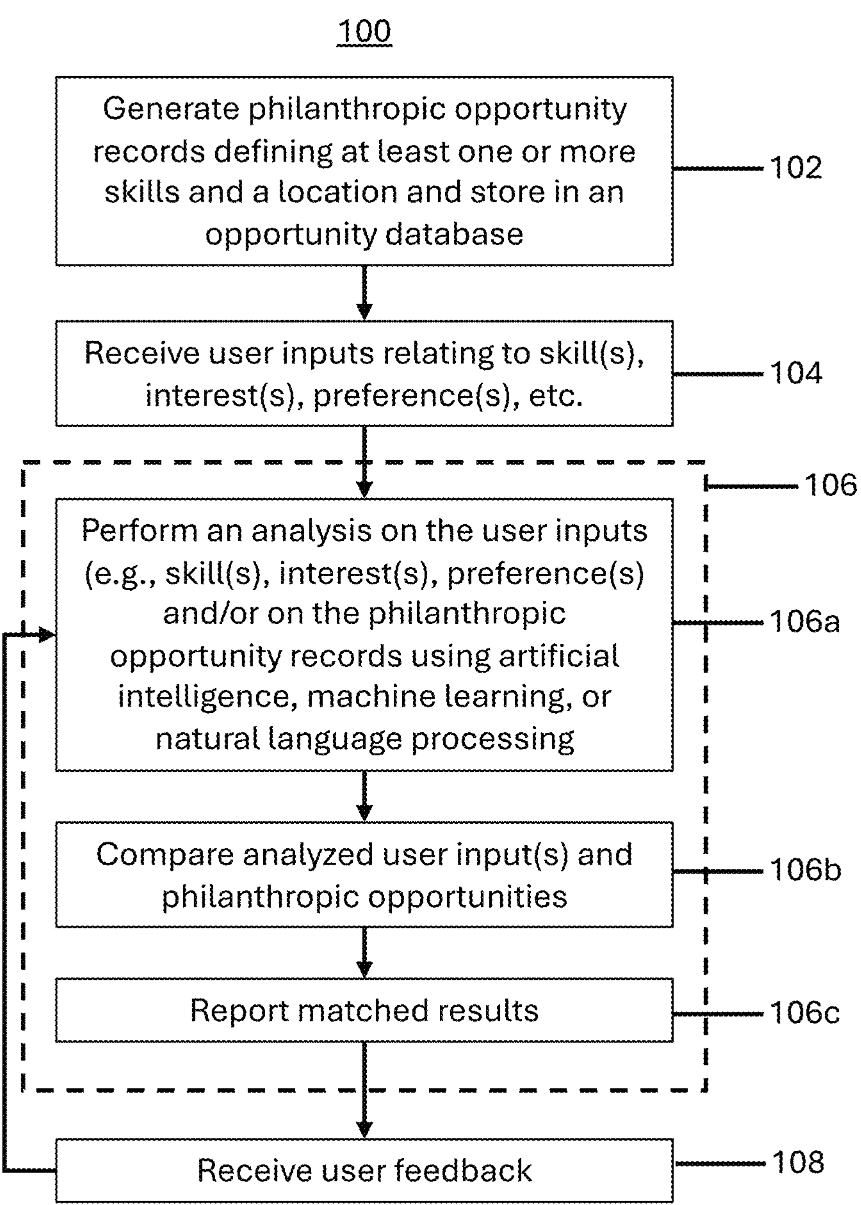
FIG. 3 is a high-level flow chart illustrating the skills-based and community-driven philanthropy method as disclosed in accordance with at least one embodiment of the present invention.

As shown in the accompanying drawings, and with particular reference to FIGS. 1 and 3, for example, at least one embodiment of the present invention is generally directed to a system 10 and method 100 for facilitating Seva.

More specifically, the system 10 and/or method 100 may, in some cases, be skills-based in that a matching model, module or algorithm may be implemented and used to intelligently match volunteers to one or more philanthropic opportunities based at least in part on a matched skill or preference. In other embodiments, or in the same embodiment, the system 10 and/or method 100 may be community-driven in that one or more additional features may be implemented to interactively connect or engage the community, including users of the system 10 or method 100, volunteers, prospective volunteers, donors, prospective donors or other interested parties or users. As described herein, the community-driven tools or modules may include, but are in no way limited to a streaming module 50 for live or recorded broadcasting, a community hub 60 for providing an interactive online environment or place for the users, chat features, donation integration, an analytic module 70, a disaster response module 80, a dedicated Seva module 85 for managing non-monetary contributions and resource donations, etc.

More in particular, as shown in FIG. 1, the system 10 of at least one embodiment of the present invention includes one or more management systems 20 communicative with at least one, but more practically, a plurality of user devices 30 via a network 15. Each of the user devices 30 are operable or accessible by one or more users 12, such as but in no way limited to volunteers, donors or other interested parties. As an example, the network 15 may include virtually any computer, communication or data network such as the World Wide Web, Internet, Intranet, Wide Area Network(s), Telecommunication Network(s) (e.g., 3G, 4G, 5G, LTE), etc.

Moreover, the management system 20, as disclosed in connection with certain embodiments of the present invention is structured and/or configured to manage, store and process user account or user profile information (e.g., usernames, passwords, account information, etc.), which may also include user-defined or user-provided skills, preferences, location, preferred location, etc.

In this manner, the management system 20 or platform of at least one embodiment of the present invention may be remotely located relative to the user devices 30 and may, therefore, include at least one web or cloud-based computer, server, or desktop computer, but can also, or instead, include a laptop computer, tablet, mobile or handheld computer, etc., that is capable of facilitating implementation of the present invention disclosed herein. In particular, the management system 20 may include a remote storage device or system in that it is, in many cases, external to and remote from or otherwise located in different physical or geographic locations the user devices 30. Moreover, it is noted that the platform and/or management system 20 of at least one embodiment includes, among other components and devices structured to facilitate implementation of the present invention in the intended manner, a computer processor, memory, one or more data storage devices, and one or more communication or network device(s).

Furthermore, the user device(s) 30, as disclosed herein, may include virtually any computer-based device configured to or capable of implementing various aspects of the present invention, such as, but not limited to, a mobile device or mobile terminal such as, for example, a mobile phone, smartphone, tablet computer, smart watch, wearable device, etc., as well as a laptop or mobile computer, desktop computer, video game console, video game device, etc. Accordingly, as just an example, in some embodiments or implementations, the user or mobile device(s) 30 may include, for example, an APPLE® iPHONE®, APPLE® iPAD®, ANDROID® based phone or tablet, etc. In any event, the user device(s) 30 of the various embodiments are capable of accessing one or more of the mobile applications described herein.

Moreover, with reference to the block diagram of an exemplary management system or platform 20 of at least one embodiment, the system 20 includes, among other components, at least one processor **20*a*, memory 20*b*, storage device 20*c* and a communication device or module 20*d***.

Specifically, as used herein, the processor(s) **20*a*, of at least one embodiment, may include any device cooperatively structured to execute or implement computer instructions, software, etc., including, for example, the various features and components as described in accordance with at least one embodiment of the present invention and configured to implement or facilitate the implementation of the method 100 herein. Furthermore, the processor 20*a*** or processing circuitry may be realized as one or more hardware logic components and circuits, for example, and without limitation, field programmable gate arrays (FPGAs), application-specific integrated circuits (ASICs), application-specific standard products (ASSPs), system-on-a-chip systems (SOCs), microprocessors, microcontrollers, digital signal processors (DSPs), and the like, or any other hardware logic components that can perform calculations, processing or other manipulations of information.

Further, the memory device 20*b*, as used herein, may include but is not limited to volatile memory, such as random access memory (RAM), non-volatile memory, such as read-only memory (ROM), flash memory, etc., a combination thereof, or other like device(s) configured to implement the present invention in the intended manner, for example, by storing and assisting with the execution of one or more applications, modules, or components capable of implementing the system 10 and method 100 described herein. It should be noted that non-transitory computer readable media includes all computer-readable media except for a transitory, propagating signal.

The data storage device(s) 20*c*, as used herein, may include a hard disk drive, USB drive, solid state drive, virtual drive, cloud-based storage drive, magnetic storage drive, optical storage drive, or other medium which can be used to store the desired information or data.

Moreover, the communication or network device 20*d* may include a network communication hardware/software component structured to facilitate communication between the management platform/system 20 of the present invention and the various user devices 30 via the network 15.

Figure 2:
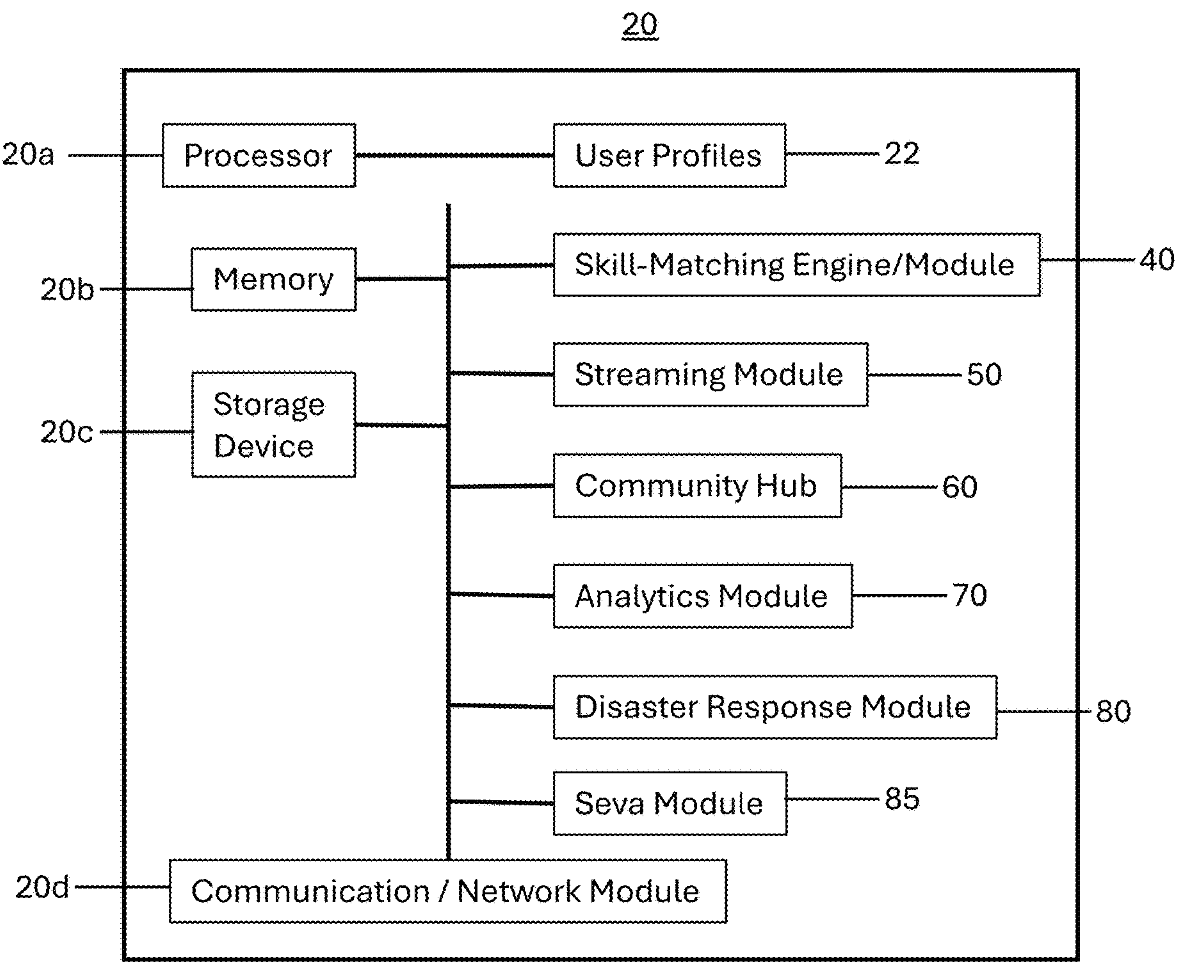
FIG. 2 is a block diagram of the management system or platform architecture as disclosed in accordance with at least one embodiment of the present invention.
Figure 4:
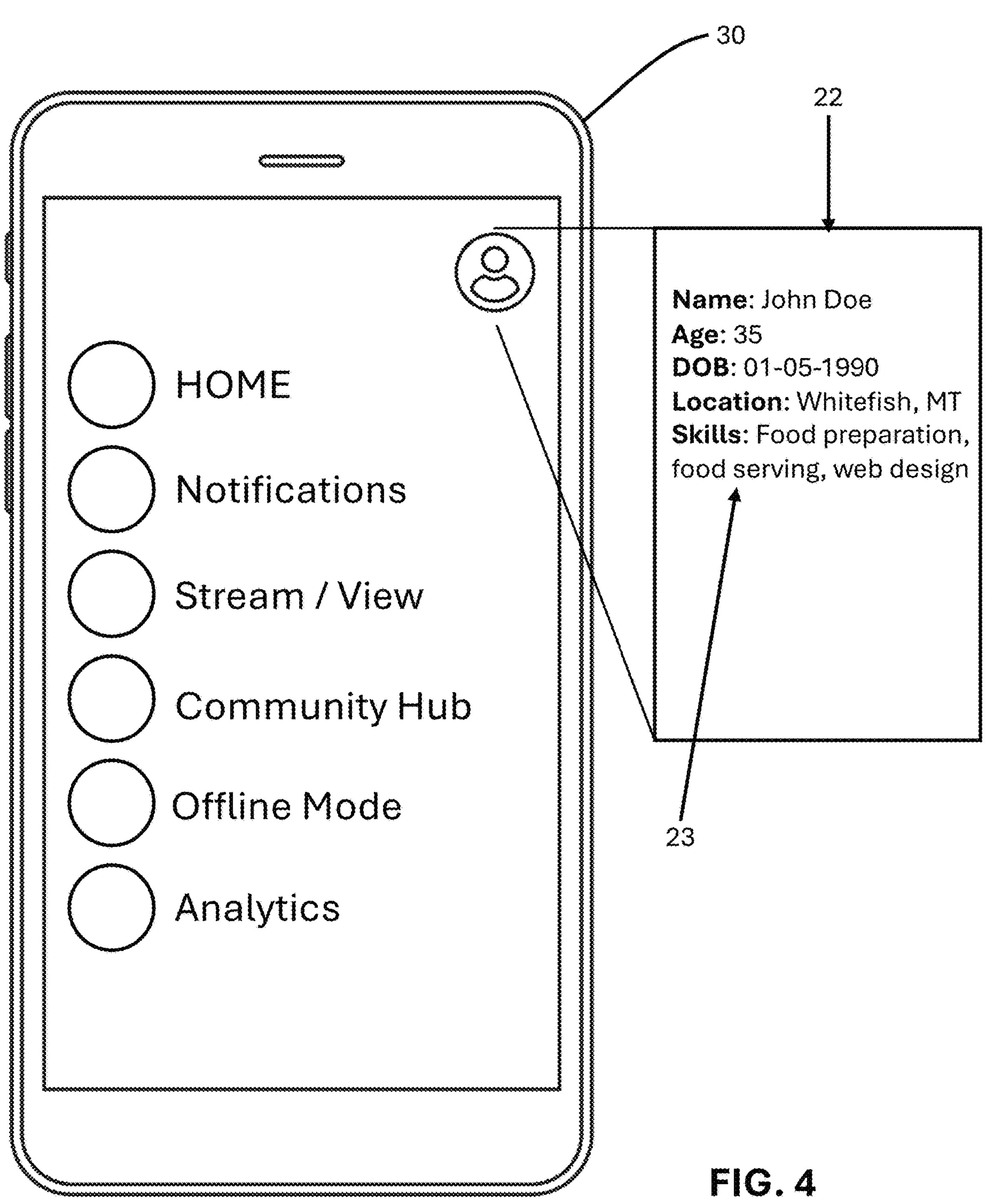
FIG. 4 is an exemplary screenshot illustrating the user profile and application menu, as disclosed in accordance with at least one embodiment of the present invention.

More in particular, still referring to FIG. 2, the management system 20 of at least one embodiment is configured to store user profiles 22 associated with each of the different users of the system 10 and/or method 100 of the present invention. As just an example, and as shown in the example of FIG. 4, the user profile 22 may include various identifying information, including but in no way limited to the user's name, a pseudonym or username, age or date of birth, location (e.g., actual location as determined by the native capabilities of the user device and/or an entered location provided by the user), and/or one or more identified skills or preferences, referenced as 23. In some embodiments, the user is able to enter a list of skills or a description of skills which the user possesses or is comfortable contributing to a philanthropic or charitable organization or event. In other embodiments, the system 10 and/or method 100 may include a pre-generated list of skills or preferences that the user is able to select from, as desired.

In some embodiments, the user must be able to provide supporting evidence of the one or more identified, selected or provided skills or preferences in order for the system 10 and/or method 100 to associate that skill or preference to the user profile 22. For example, a user may need to provide evidence of competing a training course, educational requirements, state or government licensing, etc. associated with a particular skill or preference.

For illustrative purposes only, the skills or preferences 23 used in connection with the various embodiments of the present invention may include, but are in no way limited to graphical design, construction, carpentry, medical expertise, logistics, software development, food service, food preparation, etc.

Referring again to FIG. 2, the platform or management system 20 of at least one embodiment may also include a plurality of modules, tools and/or features, including but in no way limited to a skill-matching module 40, a streaming module 50, a community hub 60, an analytics dashboard or module 70, a disaster response module 80, a dedicated Seva module 85, etc. It should be noted that several embodiments of the present invention may include none, some or all of the modules 40-85 illustrated in FIG. 2, as well as additional modules, features and/or tools not illustrated in FIG. 2.

Turning now to the flow chart illustrated in FIG. 3, the method 100 of at least one embodiment is illustrated. For example, in at least one embodiment, the method 100 includes generating or accessing one, although more practically a plurality of philanthropic opportunity records, as shown at block 102. A philanthropic opportunity, as used herein, can encompass a wide range of acts or activities aimed at improving society or achieving Seva, including but in no way limited to monetary donations to charities, supporting local organizations, and/or volunteering time and skills. As just an example, volunteering time and skills may include serving in a soup kitchen or homeless shelter, tutoring a child or student, volunteering at a local library or school, volunteering at a building or construction project, contributing to disaster relief efforts, providing or transporting resources to and/or from events or locations, supporting community initiatives, etc.

In this manner, as shown for example in FIG. 5, a philanthropic opportunity record 25, as used herein, is a physically or more practically a digitally stored record (e.g., in a database, spreadsheet or other storage format) that identifies the philanthropic opportunity, as provided above, along with other event data or information, such as applicable dates for the opportunity, the location(s) of the opportunity, the organization or charity supporting or driving the opportunity, and other criteria or information that may be necessary or helpful to describe and identify the particular philanthropic opportunity.

Accordingly, generating or accessing the philanthropic opportunity records 102 of at least one embodiment may include creating one or more entries 25 in a database, spreadsheet or other data location to define and describe each particular philanthropic opportunity. Other embodiments may include accessing one or more already generated databases that may already include a list or identification of one or more opportunities, for example, as provided by a charity or other organization.

In particular, in some cases, anyone including a registered user, a non-registered user, a member of the public, etc. can access an input interface to submit a request for a philanthropic, charitable or other like need. For example, an organization may be in search of one or more volunteers, in a particular location, that possess a particular skill. The representative of the organization can access a user-input module, for example, via a web-based form, a mobile application, etc., and provide information (e.g., type of skill, time and location for the opportunity, etc.) corresponding to the opportunity to the system, method or platform of the present invention. Doing so will, in some cases, generate a philanthropic opportunity record, as provided at 102, in accordance with at least one embodiment of the present invention.

Furthermore, as described above, and with reference again to FIGS. 3 and 4, the method 100 of at least one embodiment also includes receiving, e.g., at the management system 20 via the processor 20*a*, user profile input to define user profile records, as shown at block 104 in FIG. 3. The user profile 22, and the skill(s) or preference(s) associated therewith, may be entered by the user 12 using the device 30, for example, by typing, speech-to-text, selecting one or more pre-generated options, etc.

Still referring to FIG. 3, as shown at block 106, the method 100 includes intelligently matching, via a skill-matching module 40, at least one of the user profiles or accounts 22 with at least one of the available philanthropic opportunity records 25 based at least in part on one or more of the skills 23 recorded in the user profile 22 and the skills or preferences identified as part of the one or more philanthropic opportunity records 25.

In some embodiments, there may be a 1:1 identical match between the skill(s) 23 in the user profile 22 and the skill(s) in the philanthropic opportunity records 25. As an example, if the skill(s) 23 in the user profile 22 and the skill(s) in the philanthropic opportunity record 25 both identify "food preparation," then a match is provided. In other embodiments, however, particularly when (but not limited to) the user is able to type in or otherwise enter the skills, preferences, etc., there may not be an exact match between the user profile 22 and the records 25. In such a case, the system 10 and/or method 100 of at least one embodiment may include or utilize one or more artificial intelligence (AI), machine learning models and/or natural language processing (NLP) models in order to intelligently match the information 23 provided in the user profile 22 with the information provided in the philanthropic opportunity records 25.

More specifically, AI is a branch of computer scient that is focused on creating systems capable of performing tasks such as learning, reasoning and problem-solving. Machine-learning is a subset of AI that enables systems to learn and improve from data without explicit programming. This is used in at least one embodiment of the skill-matching model 40 of at least one embodiment to optimize volunteer-opportunity matches. Natural language processing (NLP) is also a branch of AI that enables systems to understand and analyze human language. In this manner, the sill-matching model 40 of at least one embodiment can use NLP in a manner to more readily understand and interpret the skills and preferences identified in the user profiles 22 and the philanthropic opportunity records 25 to provide more enhanced and accurate volunteer-opportunity matches.

For instance, with reference again to FIG. 3, matching the user skills to the opportunity skills may include several steps, including, analyzing the user profiles and philanthropic opportunity records 25 using AI techniques such as machine learning and/or natural language processing, as shown at block 106*a*. Once the user's skills 23 and the opportunity skills are analyzed, interpreted and/or understood by the system 10 or method 100, the processes or analyzed skills (e.g., the user skills and the opportunity skills) are compared with one another, as shown at block 106*b*, and if a match is found such that the compared skills are similar, the method 100 is able to report the match 106*c*. Reporting the match 106*c* may be accomplished in many different manners, for example, by communicating a notification (e.g., in the form of a push notification, app notification, email, text message, phone call, etc.) to the user, the organization facilitating the opportunity, another entity or a combination thereof.

Moreover, in some embodiments, the system and/or method also includes a user feedback analysis module, generally represented at 108 in FIG. 3 which accepts user feedback, evaluates the user feedback and, in some cases, adjusts the corresponding philanthropic opportunity records 25 based thereon. For example, if a match is identified between a user and an opportunity based on an AI analysis the skills and/or other information, and that match is not accurate, is accurate, or otherwise, then the user can provide some feedback to the system and/or method based therein and the system and/or method, and in particular the feedback module thereof, is able to adjust the record and/or adjust the machine learning model for future processing and analysis.

Figure 6:
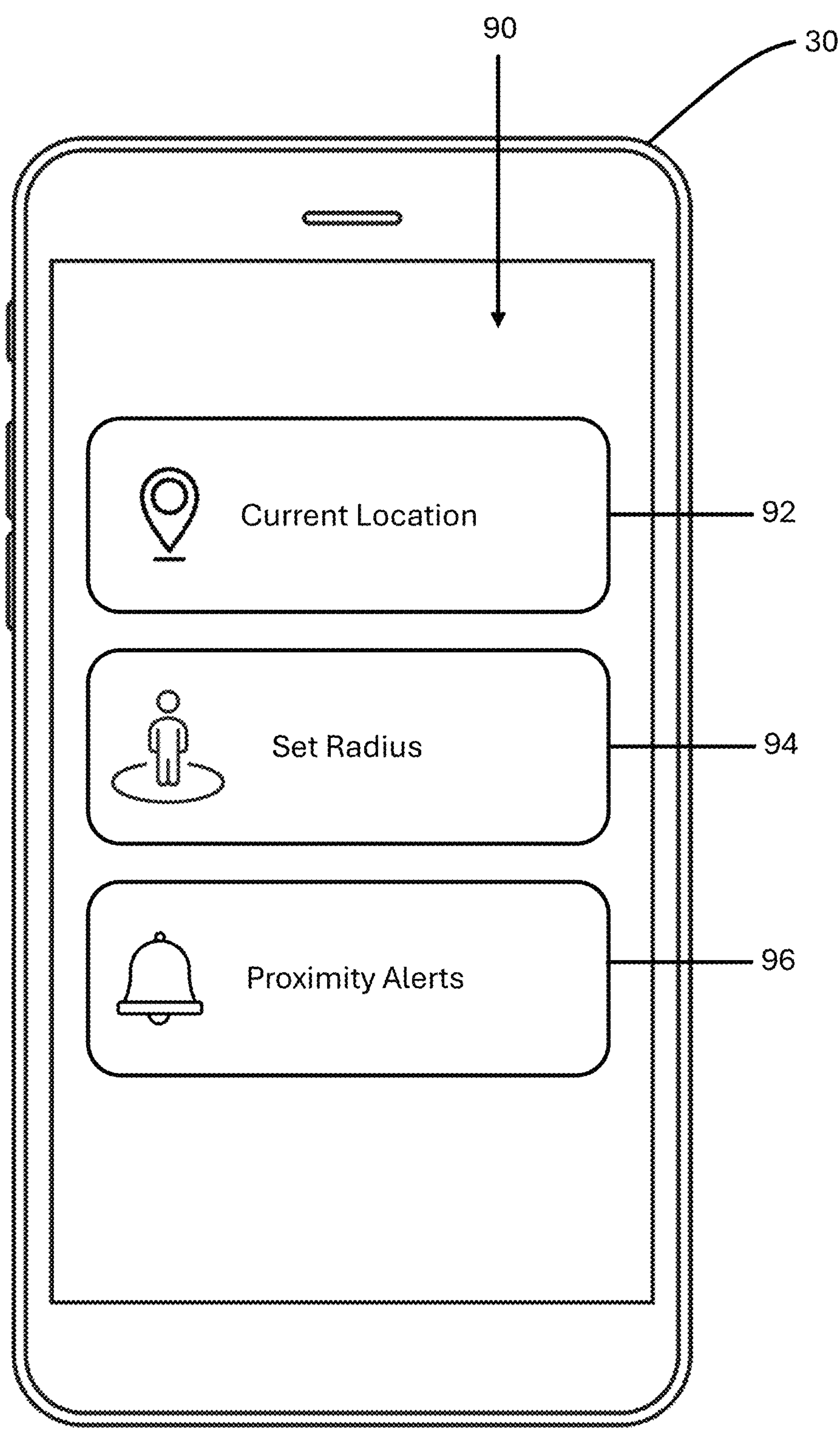
FIG. 6 is an exemplary screenshot or block diagram illustrating the geolocation module as disclosed in accordance with at least one embodiment of the present invention.

With reference now to FIG. 6, at least one embodiment of the present invention also includes a geolocation module, generally referenced as 90, for evaluating a geolocation of the user device 30 and matching the geolocation with at least one location associated with a philanthropic opportunity record 25 for providing an accurate volunteer-opportunity match. Incorporating a geolocation feature or module into the platform, system 10 or method 100 of at least one embodiment allows organizations to identify and contact users or volunteers based on their proximity to specific needs. This can be particularly useful in, but is not limited to, situations for local initiative, disaster relief efforts, and community-driven projects.

More specifically, the geolocation module 90 of at least one embodiment may use global positioning system (GPS) capabilities of the user device 30, internet protocol (IP) based location tracking, or other location-based features or techniques to identify the physical location of the user device 30, which in many cases is also the physical geolocation of the volunteer or user 12 thereof. This information can then be used to match the volunteer or user 12 with one or more opportunities in the local area in order to ensure efficient resource allocation, and in some cases, timely responses to urgent needs.

In particular, the system 10 and/or method 100 of at least one embodiment may combine the geolocation matching with the skill-matching described herein such that only volunteers or users who match both the skill and location of the philanthropic opportunity record 25 are matched with the opportunity. In other embodiments, however, the system 10 and/or method 100 may use a weighted algorithm or other analysis taking into consideration one or both of the location and/or skill(s) to effectuate a match.

FIG. 6 shows an exemplary block diagram of the geolocation module 90 of at least one embodiment shown the user's current location, represented at block 92, a geo-fence or radius 94 and proximity alerts 96. For instance, the current location 92 may be determined by the location capabilities of the device 30 or other methods described above and in some cases, may not be changed by the user. In other embodiments, a user may be able to change the location in order to search for or view opportunities in other locations.

The radius 94 may in some embodiments be specified by the user or in other embodiments set by the system or method that the user cannot change. In any case, the radius identifies the area radially extended from the user's current location which the system or method can match to opportunities in the same area (e.g., based on the location identified in the philanthropic opportunity record 25).

The geolocation module or feature of at least one embodiment also allows the user to receive proximity alerts 96 on the mobile device 30 that relate to matches generated y the system which are proximate to the user or otherwise within the defined geographical location or area. In this manner, users or volunteers are matched with opportunities at least partially based on their proximity to the project site. The term at least partially is used here because other factors in addition to location can be used to determine a match including the skills, as described herein.

Organizations can, therefore, specify the geographic area for their projects or opportunities and in some embodiments, the system 10 or method 100 can prioritize users within that area. In other words, users within the geographic area can be identified as matches prior to users outside of the geographic area (that may also include a matched skill) allowing the users within the area to accept the opportunity first. The proximity notifications can include details about the opportunity, the required skill(s) for the opportunity, and the distance from the user's current location.

This can highlight Seva opportunities that are culturally or regionally relevant, such as food drives during local festivals or clean-up campaigns in specific neighborhoods.

Moreover, in emergencies or disaster relief situations, the platform, system 10 or method 100 can be used to activate a disaster response mode that can prioritize local volunteers and match them with critical needs in real-time. This can allow organizations to quickly identify and contact volunteers in the affected area such that volunteers or users receive notifications through the device 30 about urgent needs in the area.

Figure 7:
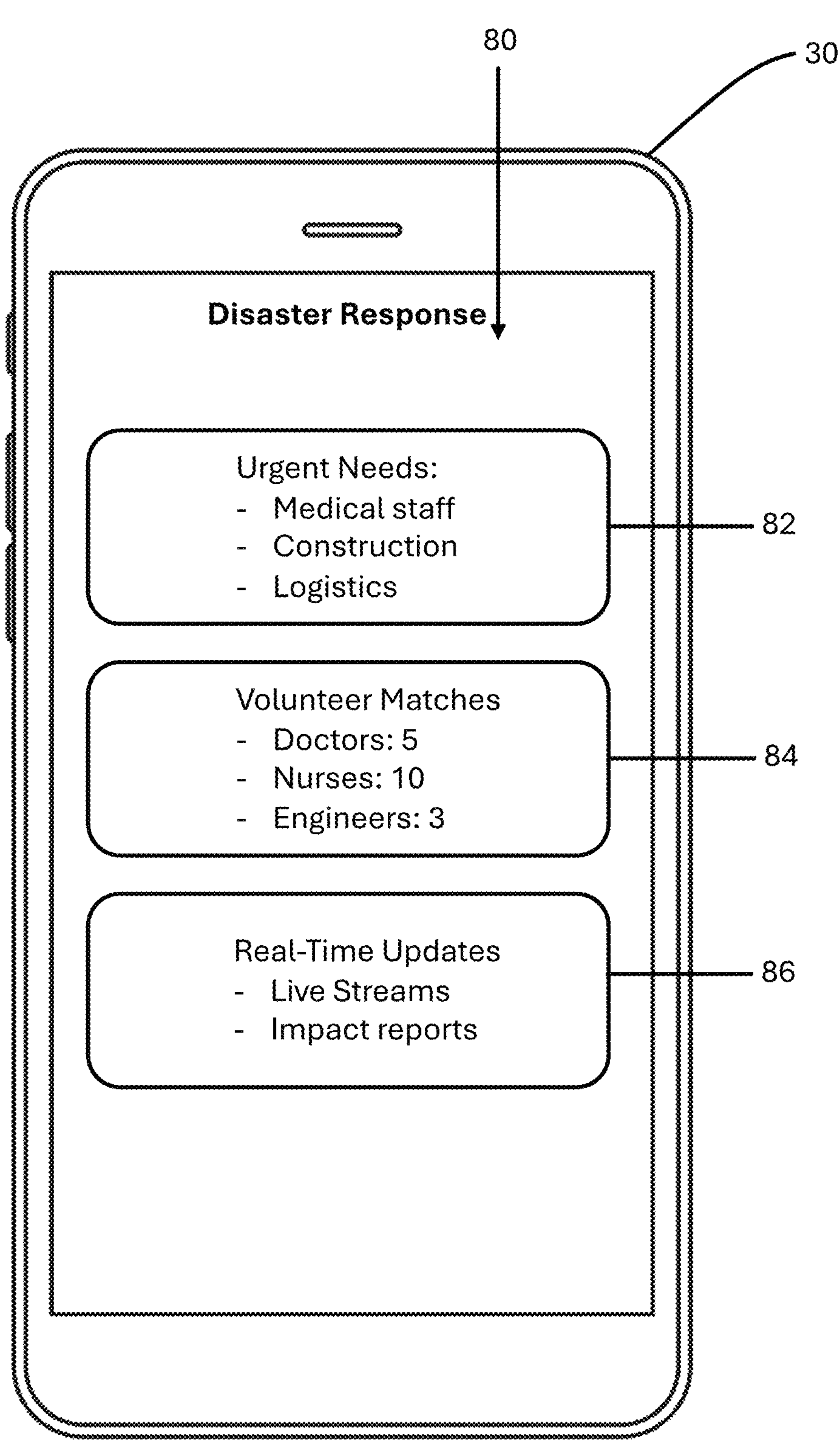
FIG. 7 is an exemplary block diagram illustrating the disaster response mode as disclosed in accordance with at least one embodiment of the present invention.

FIG. 7 is an exemplary block diagram of the disaster response module 80 or mode accessible by a user, organization or emergency-relief entity. In particular, the disaster response module 80 of at least one embodiment can identify the urgent needs 82 based on the particular disaster and situation, identify the particular volunteer matches 84 that have occurred by the system 10 or method 100 (e.g., via the location-based module, the skill-matching module, etc.), and identify real-time or near real-time updates on the situation.

Further features of certain embodiments of the present invention include community-driven modules and/or features combined with the skill-matching and/or geolocation modules described herein in order to enhance community support and encourage collaboration between the users, volunteers, etc. As just an example, some of the community-driven modules or features can include, but are not limited to a streaming module (FIGS. 8 and 9), community hub (FIG. 10), gamification module (FIG. 11), multi-lingual or global access module (FIG. 12), etc.

Figure 8:
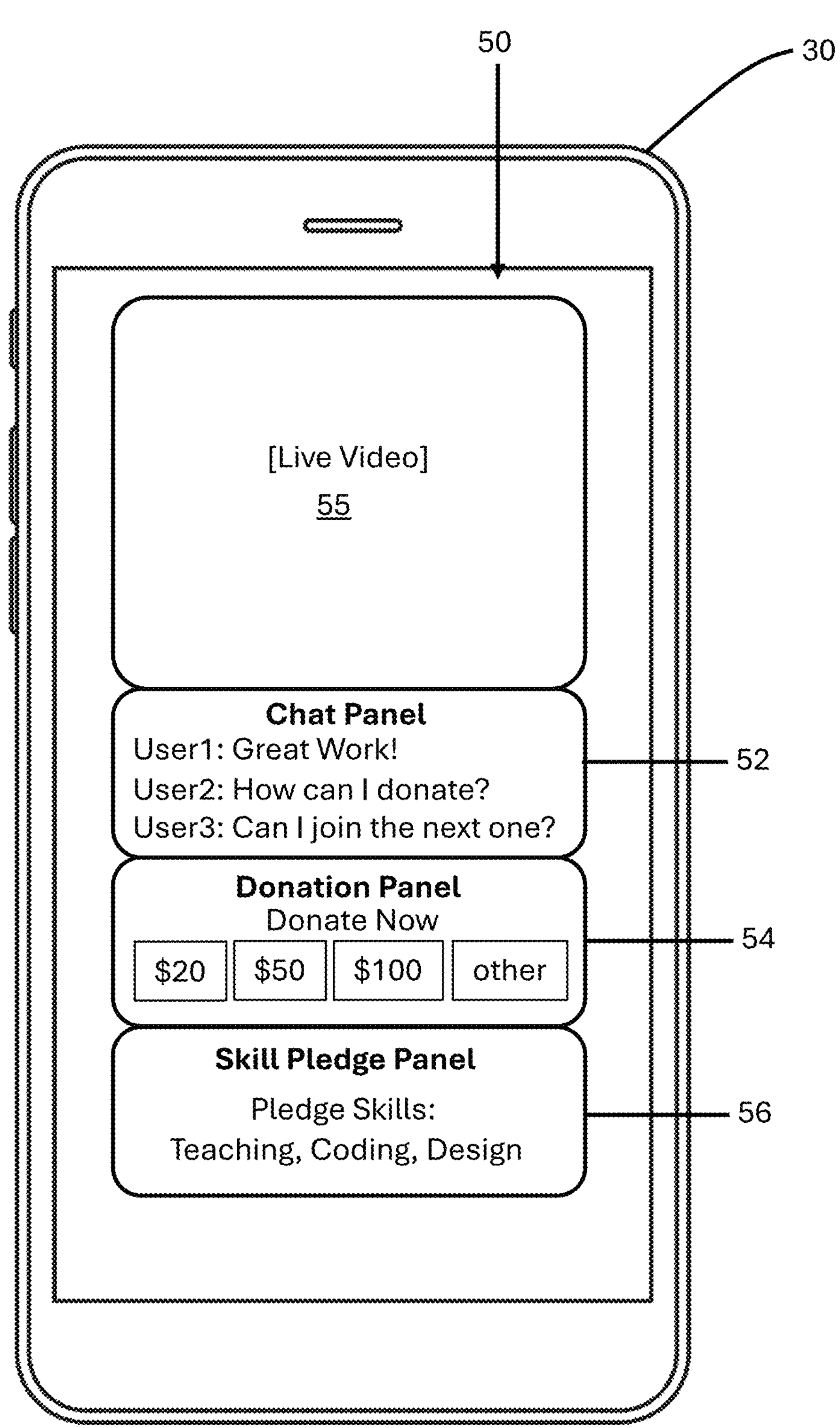
FIG. 8 is an exemplary screenshot illustrating the streaming module and interactive community tools as disclosed in accordance with at least one embodiment of the present invention.

More specifically, with reference now to FIG. 8, at least one embodiment of the present invention includes a streaming module 50 accessible by the one or more user device 30 for live or recorded broadcasting or immersive streaming a progression of a philanthropic project. In other words, the streaming module 50 of at least one embodiment allows users 12 to broadcast their activities (e.g., teaching, construction, etc.) or charitable contributions in real-time and interact with viewers and/or engage with a community of like-minded individuals in real-time.

For instance, a user 12 may choose to broadcast or stream the philanthropic activity live for other users, donors, or viewers to watch and interact with the broadcasting user. In this manner, the streaming module of at least one embodiment includes one or more interactive engagement tools, including but in no way limited to a chat tool or panel 52, a donation integration tool, panel or module 54, and a skills pledge tool or panel 56, for viewers to interact with the streamer via chat, donations and skills pledges.

In some embodiments, the donations panel or module 54 allows the viewers to make a donation payment (e.g., through a credit card, bank card, debit card, bank account transfer, direct transfer, peer-to-peer payment application such as VENMO® or PAYPAL®, or a proprietary financial or token driven payment system) directly through or via the streaming module 50. In some cases, the donation(s) provided through the streaming module 50 will be donated to the organization facilitating the project depicted in the live or recorded video stream 55, to the particular project depicted in the live or recorded video stream 55, or to the broadcasting user.

Additional interactive engagement tools may also include a poll or quiz panel or module 58 which present quizzes, polls, questions or other interactive prompts to the viewers requesting a response or interaction by the viewer. The poll, quiz or other prompt may overlay the screen, overlay the live video 55, may be integrated into the video stream via augmented reality (AR) or other similar techniques, etc.

Figure 9:
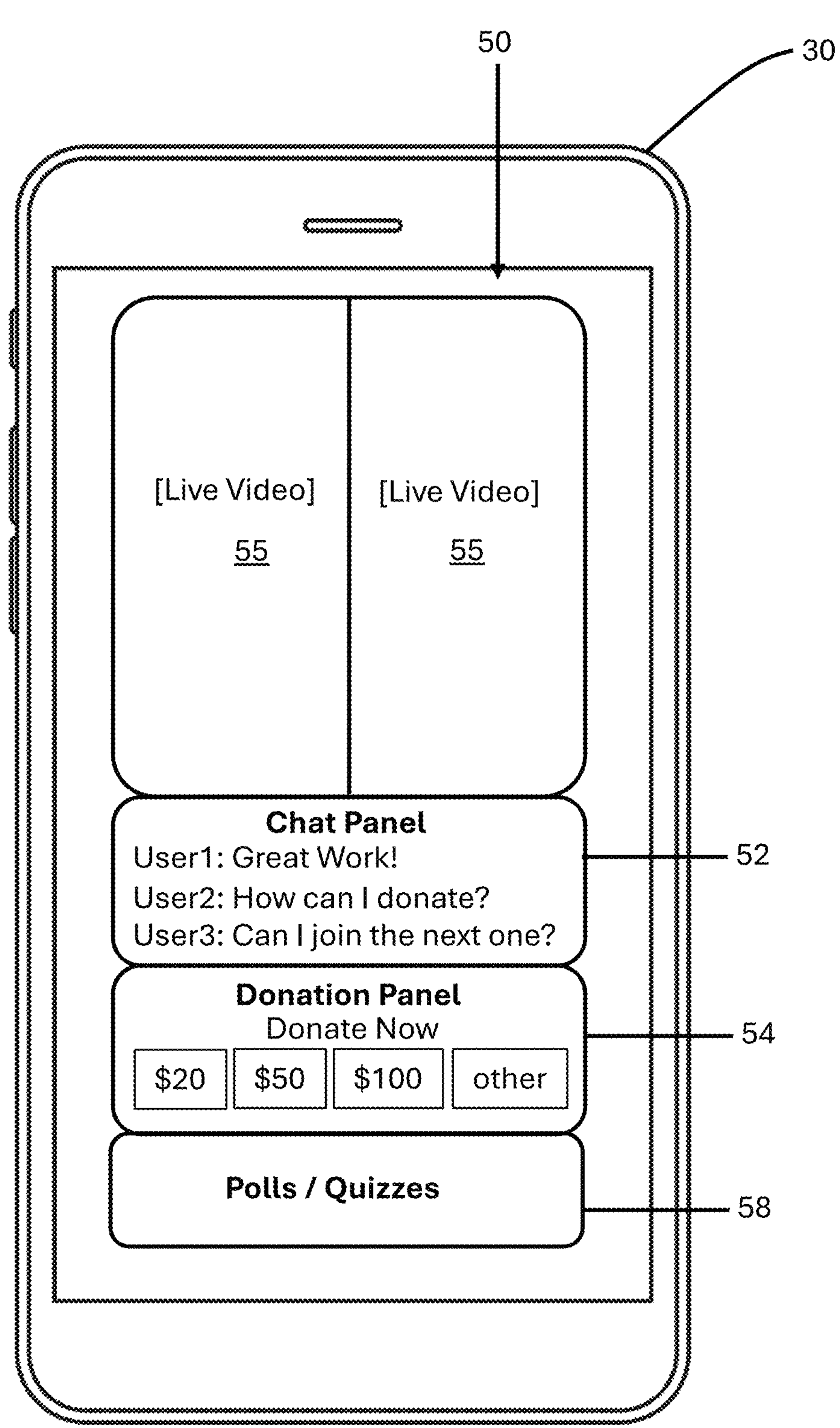
FIG. 9 is another exemplary screenshot illustrating the streaming module and interactive community tools as disclosed in accordance with at least one embodiment of the present invention.

With reference to FIG. 9, additional features of the streaming module 50 of at least one embodiment may include a split-screen or multi-screen mode allowing multiple broadcasting users or multiple cameras to broadcast or stream the progression of or operation of one or more philanthropic projects.

For instance, in some cases, the same philanthropic project may be broadcasted from several (e.g. two or more) different angles or several different cameras, whereas in other embodiments, multiple (e.g., two or more) related or unrelated philanthropic projects (and the progression or operation thereof) may be simultaneously broadcasted by multiple users.

Additional community-driven modules, such as a community hub module 60, a gamification module 62, a multilingual module 64 and an analytic module 70 are also provided in accordance with some embodiments of the present invention, as illustrated in FIGS. 10-13.

Figure 10:
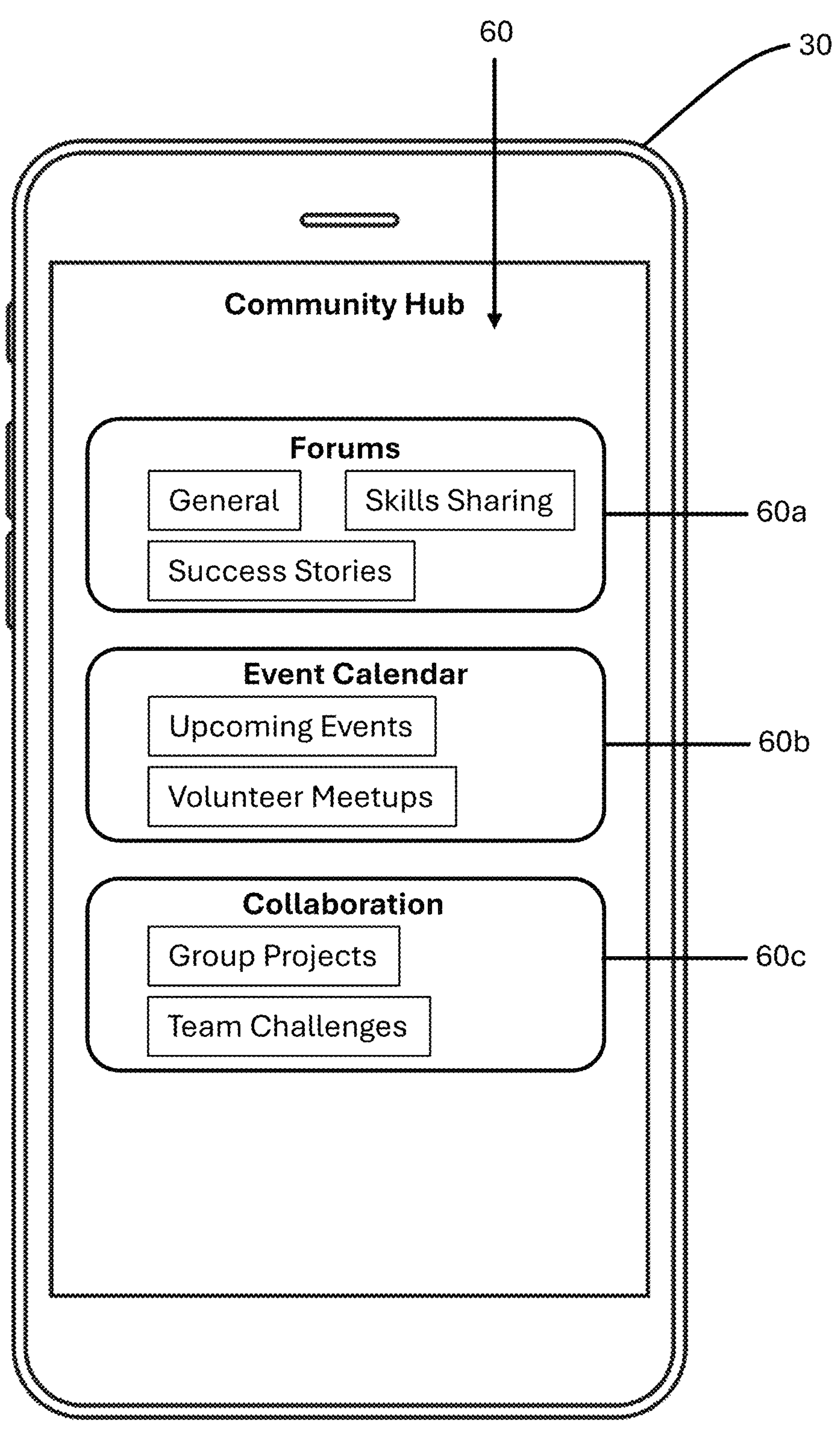
FIG. 10 is an exemplary screenshot and block diagram illustrating a community hub as disclosed in accordance with at least one embodiment of the present invention.
Figure 11:
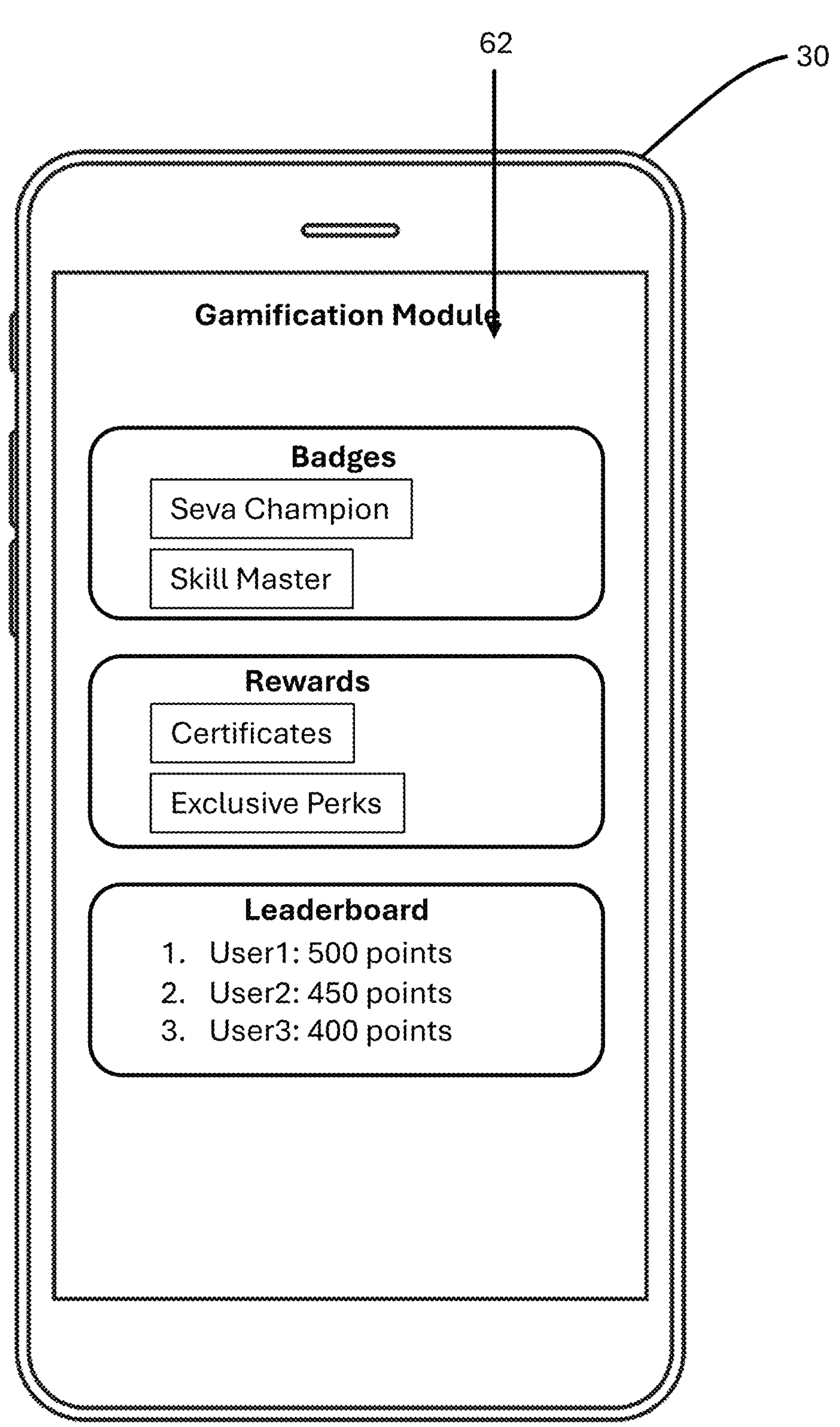
FIG. 11 is an exemplary screenshot and block diagram illustrating the gamification module as disclosed in accordance with at least one embodiment of the present invention.

For example, with reference to the community hub module 60 illustrated in FIG. 10, at least one embodiment of the present invention includes one or more community features or tools that allow the users, volunteers, donors, and in some cases, organizations, collaborate and communicate and engage with one another or other like-minded individuals. For example, one or more online forums 60*a* may provide users with the environment to discuss topics related to philanthropy and Seva, share success stories, and seek advice.

An event calendar 60*b* may also be included where organizations (e.g., charities, non-profit organizations and the like) can post events where users (e.g., volunteers, donors, etc.) can RSVP or volunteer.

Other collaboration tools 60*c*, such as group projects, team challenges, and shared goals can be posted, listed, shared and discussed in the community hub 60, as desired.

The gamification module 62 of at least one embodiment allows users (e.g., volunteers, donors, etc.) to earn badges, certificates, and milestones for contributions (e.g., monetary donations, volunteering efforts, etc.) in order to encourage sustained engagement. For example, through the gamification module, users (e.g., donors, volunteers, or others) are able to progressively earn badges or rewards by donating funds, providing non-monetary contributions, etc. A point system may be implemented to assign points based on donations, contributions, etc. over a particular amount of time or period.

Figure 12:
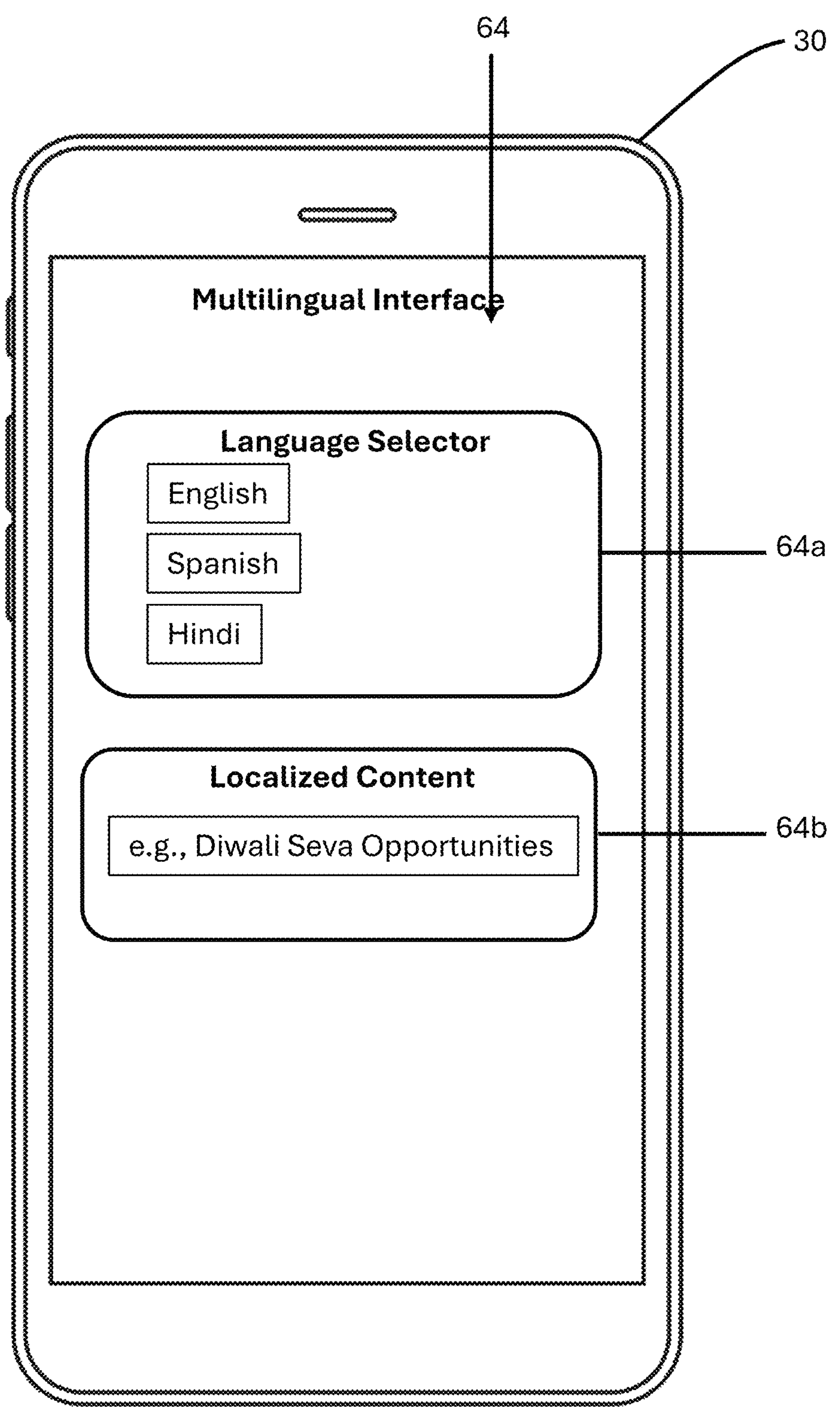
FIG. 12 is an exemplary screenshot and block diagram illustrating the multi-lingual module as disclosed in accordance with at least one embodiment of the present invention.

With reference to FIG. 12, global accessibility and multilingual support of the system 10 and method 100 of at least one embodiment is exemplified. For instance, the system 10 and method 100 of at least one embodiment may be configured to serve a diverse, global audience without regard to language barriers or cultural differences and ensuring accessibility for users with disabilities.

For instance, in today's interconnected world, philanthropy and Seva are global endeavors. However, many platforms fail to address the needs of non-English speakers, users from diverse cultural backgrounds and individuals with disabilities. In this manner, several embodiments of the present invention incorporate features that ensure accessibility, inclusivity and localization.

More specifically, the multi-lingual module 64 of at least one embodiment may support multiple languages, allowing users to select a language 64*a* and interact with the platform using the native or selected language. In some cases, selecting a language will translate or convert some or all of the menus options, opportunity descriptions, streaming captions, community forums, displays, features, text, etc., shown in the application to the selected language, including, in some cases, content submitted by other users in other languages.

In some cases, the languages shown in the language selector 64*a* may be dynamically displayed or sorted based on the detected location of the user or user device 30. Furthermore, the content of the platform, such as the forums, streaming modules, opportunity descriptions, etc. may be tailored to reflect regional and cultural contexts, ensuring relevance and resonance with local users. Localized event calendars can be created to highlight regional-specific Seva opportunities, such as religious festivals or community-driven initiatives.

Other features can include voice-activated navigation (e.g., allowing users to navigate the platform or application using voice commands, making it accessible to individuals with visual or motor impairments), screen reader compatibility (e.g., wherein the platform is fully compatible with screen readers, ensuring accessibility for visually impaired users), high-contrast mode (e.g., for a high-contrast visual interface).

In some cases, the platform incorporates cultural sensitivity into the design, ensuring that the content and features respect diverse traditions, values and practices. For example, Seva opportunities may be categorized by cultural or religious contexts, such as food drives during Ramadan or volunteer opportunities during Diwali.

Figure 13:
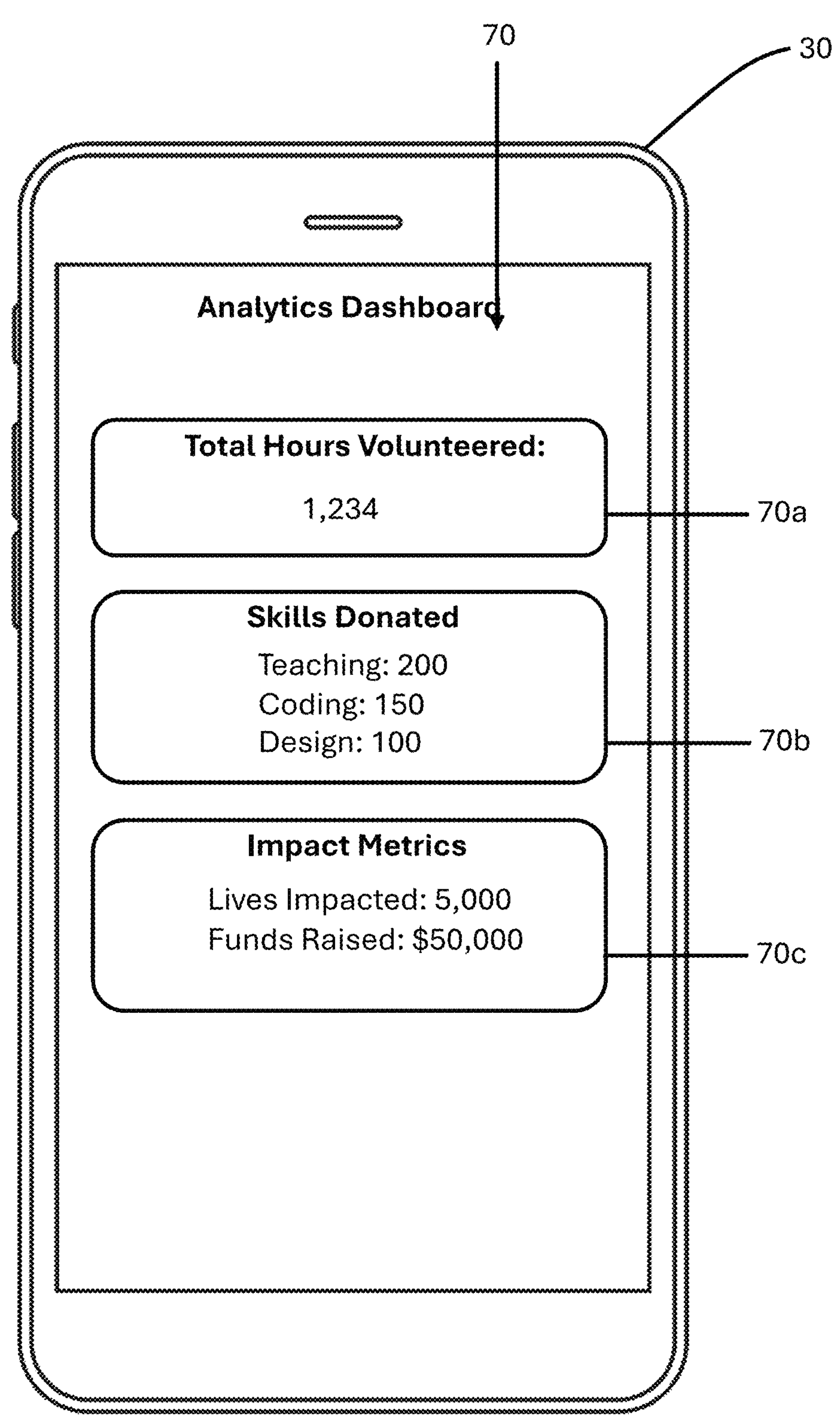
FIG. 13 is an exemplary screenshot and block diagram illustrating the analytics module as disclosed in accordance with at least one embodiment of the present invention.

Moreover, FIG. 13 illustrates an exemplary analytics module or dashboard 70 that includes tools for tracking the impact of skill-based contributions, including but not limited to hours volunteered 70*a*, tasks completed or skills donated 70*b* and outcomes achieved 70*c*. The analytic module may also include metrics for global impact, such as the number of countries served, languages supported, and cross-cultural collaborations facilitates. Users can filter impact data by region, language, or cultural context. Some embodiments may be configured to generate predictive analytics using statistical algorithms, machine learning and historical data to forecast future outcomes and trends.

Furthermore, some embodiments of the present invention may also include a blockchain-based verification system for tracking and certifying skill-based contributions. For instance, smart contracts may be used for automating donor recognition and reward distribution. It should be noted that a blockchain is a decentralized, immutable digital ledge used to record transactions and verify data, ensuring transparency and security.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

The invention claimed is:

1. A skills-based and community-driven philanthropy system for facilitating Seva, said system comprising:

a remote-based management system communicative with a plurality of user devices via at least one network, said remote-based management system comprising at least one processor, memory and storage, a plurality of available philanthropic opportunity records stored at said remote-based management system, each of said plurality of available philanthropic opportunity records comprising at least one skill and at least one location, said plurality of user devices being configured to receive user profile inputs to define user profile records, said user profile inputs comprising at least one user skill preference, a skill-matching module configured to generate a user-opportunity pair comprising a user profile record and at least one of said plurality of available philanthropic opportunity records, wherein the user-opportunity pair is based on a match between said at least one user skill preference of the user profile record and said at least one skill of said at least one of said plurality of available philanthropic opportunity records, a feedback module configured to receive and evaluate user feedback relating to an accuracy of the user-opportunity pair, and to modify said at least one of said plurality of available philanthropic opportunity records based thereon, and a broadcasting platform configured to stream live audiovisual broadcasting of a progression of at least one philanthropic project, said broadcasting platform comprising a plurality of user engagement tools comprising:

a real-time donation integration tool configured to receive donations in real-time from a plurality of viewers of the progression of the at least one philanthropic project, a live chat panel where the plurality of viewers communicate with one another, and a multi-display mode where a plurality of different streams each comprising live audiovisual broadcasting of a progression of the at least one philanthropic project are simultaneously displayed.

2. The system as recited in claim 1 wherein said skill-matching module comprises at least one machine-learning model, executable by said at least one processor, to process said user profile records for providing an accurate match to at least one of said plurality of available philanthropic opportunity records.

3. The system as recited in claim 2 wherein said skill-matching module further comprises a natural language processing module executable by said at least one processor, to process said user profile records for providing an accurate match to at least one of said plurality of available philanthropic opportunity records.

4. The system as recited in claim 1 wherein said skill-matching module further comprises a geolocation module for evaluating a geolocation of at least one of said plurality of user device and matching said geolocation with said at least one location of at least one of said plurality of available philanthropic opportunity records for providing an accurate match to said at least one of said plurality of available philanthropic opportunity records.

5. The system as recited in claim 4 wherein said skill-matching module further comprises a disaster response mode that prioritizes urgent skill-based needs based on and during an identified disaster.

6. The system as recited in claim 1 wherein said donations received via said donation integration module are applied toward the at least one philanthropic project being broadcasted via the streaming module.

7. The system as recited in claim 1 wherein said multi-display mode further comprises a split-screen mode for simultaneously broadcasting multiple streams associated with a common philanthropic project or different philanthropic projects.

8. A skills-based and community-driven philanthropy method for facilitating Seva, the method comprising:

creating a plurality of available philanthropic opportunity records each comprising at least one skill and at least one location, and storing the plurality of available philanthropic opportunity records at a remote-based management system, the remote-based management system being communicative with a plurality of user devices via at least one network and comprising at least one processor, memory and storage, receiving, via said at least one processor, user profile inputs to define user profile records, the user profile inputs comprising at least one user skill preference, intelligently matching, via a skill-matching module executed by said at least one processor, at least one of the user profile records with at least one of the plurality of available philanthropic opportunity records to create a user-opportunity pair based on the at least one skill associated with the at least one of the plurality of available philanthropic opportunity records and the at least one user skill preference associated with the at least one user profile, receiving and evaluating user feedback via a feedback module relative to an accuracy of the user-opportunity pair, and modifying the at least one of the plurality of available philanthropic opportunity records based thereon, and streaming a live audiovisual broadcast of a progression of at least one philanthropic project via a broadcasting platform, defining the broadcasting platform as comprising a plurality of user engagement tools comprising:

a real-time donation integration tool configured to receive donations in real-time from a plurality of viewers of the progression of the at least one philanthropic project, a live chat panel where the plurality of viewers communicate with one another, and a multi-display mode where a plurality of different streams each comprising live audiovisual broadcasting of a progression of the at least one philanthropic project are simultaneously displayed.

9. The method as recited in claim 8 further comprising defining the skill-matching module as comprising at least one machine-learning model, executable by the at least one processor, to process the user profile records for providing an accurate match to at least one of the plurality of available philanthropic opportunity records.

10. The method as recited in claim 9 further comprising defining the skill-matching module as further comprising a natural language processing module, executable by the at least one processor, to process the user profile records for providing an accurate match to at least one of the plurality of available philanthropic opportunity records.

11. The method as recited in claim 8 further comprising defining the skill-matching module as comprising a geolocation module for evaluating a geolocation of at least one of the plurality of user device and matching the geolocation with the at least one location of at least one of the plurality of available philanthropic opportunity records for providing an accurate match to the at least one of the plurality of available philanthropic opportunity records.

12. The method as recited claim 11 further comprising prioritizing urgent skill-based needs based on and during an identified disaster.

13. The method as recited in claim 8 wherein the donations received via said donation integration module are applied toward the at least one philanthropic project being broadcasted via the streaming module.

* * * * *